ELECTRICAL SIGNAL GENERATOR

Filed Oct. 30, 1961

| MEMORY STAGE / TIME STEP | | 25 | 23 | 21 | 19 | 17 |
|---|---|---|---|---|---|---|
| | 1 | 1 | 1 | 1 | 1 | 1 |
| | 2 | 0 | 1 | 1 | 1 | 1 |
| | 3 | 0 | 0 | 1 | 1 | 1 |
| | 4 | 0 | 0 | 0 | 1 | 1 |
| | 5 | 1 | 0 | 0 | 0 | 1 |
| | 6 | 1 | 1 | 0 | 0 | 0 |
| | 7 | 0 | 1 | 1 | 0 | 0 |
| | 8 | 1 | 0 | 1 | 1 | 0 |
| | 9 | 1 | 1 | 0 | 1 | 1 |
| | 10 | 1 | 1 | 1 | 0 | 1 |
| | 11 | 0 | 1 | 1 | 1 | 0 |
| | 12 | 1 | 0 | 1 | 1 | 1 |
| | 13 | 0 | 1 | 0 | 1 | 1 |
| | 14 | 1 | 0 | 1 | 0 | 1 |
| | 15 | 0 | 1 | 0 | 1 | 0 |
| | 16 | 0 | 0 | 1 | 0 | 1 |
| | 17 | 0 | 0 | 0 | 1 | 0 |
| | 18 | 0 | 0 | 0 | 0 | 1 |
| | 19 | 1 | 0 | 0 | 0 | 0 |
| SW1, SW4 | 20 | 0 | 1 | 0 | 0 | 0 |
| OPEN | 21 | 0 | 0 | 1 | 0 | 0 |
| | 22 | 1 | 0 | 0 | 1 | 0 |
| | 23 | 0 | 1 | 0 | 0 | 1 |
| | 24 | 1 | 0 | 1 | 0 | 0 |
| | 25 | 1 | 1 | 0 | 1 | 0 |
| | 26 | 0 | 1 | 1 | 0 | 1 |
| | 27 | 0 | 0 | 1 | 1 | 0 |
| | 28 | 1 | 0 | 0 | 1 | 1 |
| | 29 | 1 | 1 | 0 | 0 | 1 |
| | 30 | 1 | 1 | 1 | 0 | 0 |
| | 31 | 1 | 1 | 1 | 1 | 0 |
| | 32 | 1 | 1 | 1 | 1 | 1 —REPEAT |
| | 33 | 0 | 1 | 1 | 1 | 1 |
| | 34 | 0 | 0 | 1 | 1 | 1 |

| MEMORY STAGE | 25 | 23 | 21 | 19 | 17 |
|---|---|---|---|---|---|
| SW1, SW2 OPEN | 1 | 1 | 1 | 1 | 1 |
| | 0 | 1 | 1 | 1 | 1 |
| | 1 | 0 | 1 | 1 | 1 |
| | 0 | 1 | 0 | 1 | 1 |
| | 0 | 0 | 1 | 0 | 1 |
| | 0 | 0 | 0 | 1 | 0 |
| | 1 | 0 | 0 | 0 | 1 |
| | 0 | 1 | 0 | 0 | 0 |
| | 0 | 0 | 1 | 0 | 0 |
| | 1 | 0 | 0 | 1 | 0 |
| | 0 | 1 | 0 | 0 | 1 |
| | 1 | 0 | 1 | 0 | 0 |
| | 0 | 1 | 0 | 1 | 0 |
| | 1 | 0 | 1 | 0 | 1 |
| | 1 | 1 | 0 | 1 | 0 |
| | 0 | 1 | 1 | 0 | 1 |
| | 0 | 0 | 1 | 1 | 0 |
| | 0 | 0 | 0 | 1 | 1 |
| | 0 | 0 | 0 | 0 | 1 |
| | 1 | 0 | 0 | 0 | 0 |
| | 1 | 1 | 0 | 0 | 0 |
| | 1 | 1 | 1 | 0 | 0 |
| | 0 | 1 | 1 | 1 | 0 |
| | 0 | 0 | 1 | 1 | 1 |
| | 1 | 0 | 0 | 1 | 1 |
| | 1 | 1 | 0 | 0 | 1 |
| | 0 | 1 | 1 | 0 | 0 |
| | 1 | 0 | 1 | 1 | 0 |
| | 1 | 1 | 0 | 1 | 1 |
| | 1 | 1 | 1 | 0 | 1 |
| | 1 | 1 | 1 | 1 | 0 |
| REPEAT— | 1 | 1 | 1 | 1 | 1 |
| | 0 | 1 | 1 | 1 | 1 |
| | 1 | 0 | 1 | 1 | 1 |

INVENTOR.
FRANK N. TULLOS,
BY John B Davidson
ATTORNEY.

United States Patent Office 3,119,097
Patented Jan. 21, 1964

3,119,097

ELECTRICAL SIGNAL GENERATOR

Frank N. Tullos, Houston, Tex., assignor, by mesne assignments, to Jersey Production Research Company, Tulsa, Okla., a corporation of Delaware Filed Oct. 30, 1961, Ser. No. 148,359
5 Claims. (Cl. 340—168)

Figures 1, 2, 3:
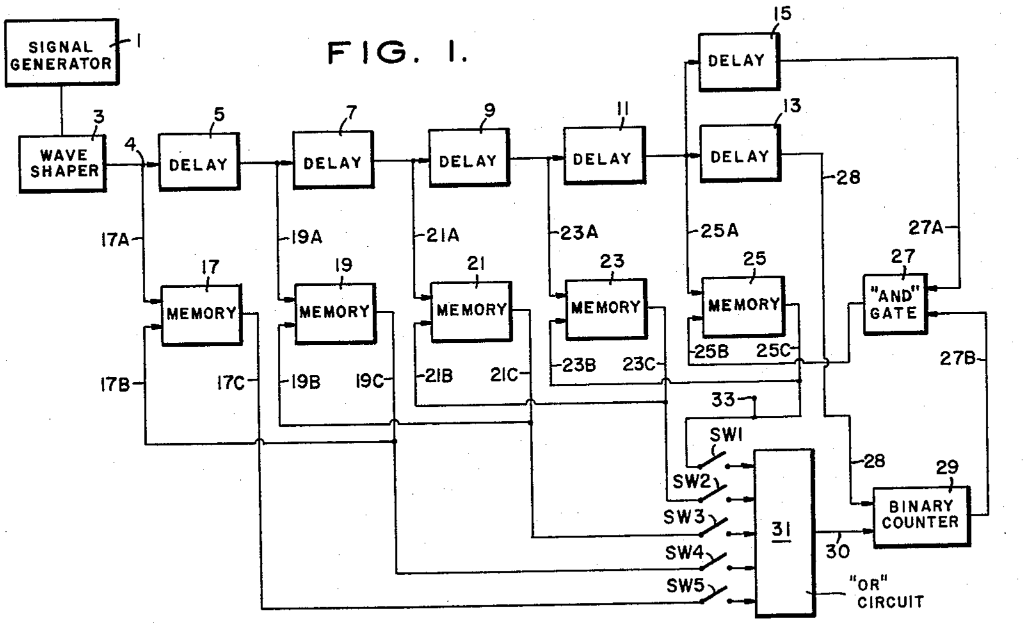

This invention relates to an electrical signal code generator, and more particularly to apparatus for generating electrical voltage or current signal pulses in accordance with a multiplicity of preselected codes.

There exists in the computer art, in the communications art, and in the geophysical prospecting art a need for generating a pseudo-random signal, sometimes called a signal representing a shift register binary code of maximal length. Apparatus capable of fulfilling this need deliver pulses that seem to be randomly spaced in time. While a number of devices have been devised for generating electrical code groups of a pseudo-random nature, such devices usually are extremely complex and completely lacking in flexibility.

In a binary code the binary 1 denotes the presence of a pulse of a particular polarity; the binary 0 denotes the absence of a pulse of a particular polarity. Both binary 1's and binary 0's are generated in identical time intervals. A shift register binary code group of maximal length defines a binary code formed by operating on a binary code group of N digits or binaries according to a predetermined rule of formation such that the code group will not repeat itself before $2^{N-1}$ digits. Expressed in another manner, a binary code of maximal length is a binary code wherein a binary group of N digits at the beginning thereof is not repeated until the code has at least $2^{N-1}$ digits therein. For example, if the code group 01101 is used, N will be equal to 5 and $2^{N-1}$ equals 31. A shift register binary code of maximal length can be formed therefrom by starting off with 01101 and setting the next element equal to the sum modulo 2 of the first, second, third, and fifth digits preceding it. This process is repeated for each successive element and the following code is obtained:

0110100001100100111110111000101

By applying the above-specified rule of formation, it will be found that after 31 elements, the sequence will repeat. For a more complete discussion of shift register or null sequence code of maximal length, reference may be had to the following: "The Synthesis of Linear Sequential Coding Networks" by D. A. Huffman, Proc. Third London Symposium on Information Theory, September 1955; "Several Binary-Sequence Generators" by N. Zierler, Tech. Rep. 95, Lincoln Laboratory, Massachusetts Institute of Technology, Cambridge, Massachusetts, September 1955.

Before proceeding with a description of the invention, it is well to define certain of the components that are utilized therein and to briefly describe their operation. The components to which reference is made are electrical or electromechanical devices that are referred to in the art as AND, OR, and MEMORY circuits. AND and OR circuits may be defined as circuits that respond to a plurality of conditions and have an output dependent on such conditions. The relationship is such that the AND element transfers from a first to a second output condition or state only if all of the conditions are present. In an OR circuit, an output signal is produced if any of the plurality of conditions are present. For example, in an OR circuit having plural input circuits, an output signal is produced when energy is supplied to any of its input circuits. A MEMORY circuit is a bistable circuit that, in response to a first condition, produces an output signal that is maintained even though the first condition thereafter is discontinued. The MEMORY element is reset and the output signal terminated in response to a second condition. Thus, the MEMORY circuit may produce an output voltage or current in response to a signal applied to a first control circuit thereof even though the signal is discontinued, and will discontinue the output signal only in response to a second signal applied to a second control circuit thereof. Suitable AND, OR, and MEMORY circuits for use with the present invention are well known in the art. Particularly suitable AND, OR, and MEMORY circuits are manufactured by Engineered Electronics Company of Santa Ana, California and are respectively designated as Model T–410A, Model T–602, and Model T–103. These particular devices make use of transistors as valve elements. However, it should be noted that apparatus for use with the invention are not limited to transistor devices but may include magnetic amplifiers, high-vacuum electronic valves, other types of semiconductor valves, or any combination thereof.

In accordance with the teachings of this invention, there is provided a shift register binary counter wherein a plurality of N serially connected MEMORY devices are consecutively pulsed one after the other by an input pulse so that the MEMORY devices are consecutively shifted thereby from a first stable state to a second stable state. The MEMORY devices are serially connected in an open-ended chain in such a manner that a given MEMORY device, upon being shifted to its second stable state, will return to its first stable state the immediately preceding MEMORY device in the chain that was shifted to its second stable state. Each MEMORY device produces an output pulse upon being shifted to its second stable state. Circuit means are provided for returning the last of the MEMORY devices to be pulsed by the input pulse to its first stable state only when an even number of pulses are received thereby from the MEMORY devices. Thus, by using selective coupling-decoupling means, such as a bank of switches, to connect the output pulses to said circuit means, it will be found that the conductive state of the said last MEMORY stage will appear to vary in a random manner in response to a succession of input pulses, but that in fact the variation is according to a definite pattern. Inasmuch as the conductive states of the MEMORY devices are transferred up the chain of MEMORY devices upon every pulsing by an input pulse, the conductive state of the last MEMORY stage, as determined by a given pulse, is successively transferred up the chain by succeeding pulses. The number of output pulses produced by each input pulse will vary as the conductive states are thus transferred up the chain. By using the input pulse train of constant repetition rate and by using the output pulses of any of the MEMORY devices as the output of the system, a multiplicity of electrical pulse codes can be generated by varying the number of switches that are closed to connect the MEMORY devices output pulses to the circuit means.

The invention may be alternatively described in the following manner. Let it be assumed that there is available an electrical MEMORY device with two stable states wherein one state represents the binary numeral "one" (hereinafter referred to as the "one" state), and the other state represents the binary numeral "zero" (hereinafter referred to as the "zero" state). Let it be further assumed that the MEMORY device is provided with means for reading the state of the device responsive to a read pulse fed thereinto. One way to do this is termed "destructive readout" and functions in the following manner. The MEMORY device is so connected that it is always fed to the "zero" state thereof when the read pulse is introduced thereinto. Furthermore, the output of the MEMORY device is so connected that there is an output pulse when, and only when, the device changes from the "one" state to the "zero" state. In this manner the device delivers an output pulse responsive to a read pulse when the device is in the "one" state at the time the read pulse is introduced. An output pulse may be assumed to represent the binary numeral "one," and the absence of an output pulse may be assumed to represent the binary numeral "zero."

A series of such MEMORY devices may be so connected as to compose a shift register. The read pulse can be successively applied to the MEMORY devices in one direction down the series, and the information in the individual MEMORY devices as represented by the stable states thereof can be made to progress in the opposite direction up the series. This can be accomplished in the following manner. First, the read pulse is applied to a chain of delay devices so as to successively pulse the MEMORY device. The output circuits of the individual MEMORY devices will be connected through a coupling network to a counter buss and through another coupling network to the preceding MEMORY device in the series in such a manner as to set the preceding MEMORY device to the "one" state thereof if there is a "one" stored in the device being read. Thus, at the end of the read period, each MEMORY device will have stored in it the information that had been stored in the next MEMORY device down the series before the reading operation.

The binary counter may be a conventional single stage counter coupled to the aforementioned counter buss. The counter is connected so as to count the number of pulses fed to the counter buss by the MEMORY devices. If an even number of "one's" are stored in the MEMORY devices, the counter will be in the "zero" state when it is read; if there are an odd number of "one's" stored in the MEMORY devices when they are read the counter will be in the "one" state when it is read. After all of the MEMORY devices are read and the counter makes the decision "even" or "odd," the counter is read if it contains a "one." This "one" is transferred to the MEMORY device that is last in the aforementioned series. If there are no "one's" in any of the MEMORY devices at the time of the reading, the counter will also end up with a "zero" and there will be no change of state of any of the devices when they are read. Thus, it is always necessary to have at least one MEMORY device in the "one" state for the apparatus to function. This may be done by including in the circuit a starting switch that will set the initial condition of the devices when it is desired to generate a code sequence.

Objects and features of the invention not apparent from the above discussion will become evident upon consideration of the following description thereof when taken in connection with the accompanying drawings, wherein:

FIG. 1 is an electrical schematic diagram of an embodiment of the invention;

FIG. 2 is an illustration in tabular form of the conditions that the MEMORY device in FIG. 1 will assume upon being consecutively pulsed assuming switches SW2 and SW4 to be open, and the other switches illustrated to be closed; and FIG. 3 is a table similar to FIG. 2 illustrating in tabular form the conditions that the MEMORY circuits will assume upon being consecutively pulsed with switches SW1 and SW2 open and the other switches closed.

With reference now to FIG. 1, there is illustrated a binary shift register counter including MEMORY devices 17, 19, 21, 23, and 25, and a plurality of delay circuits 5, 7, 9, 11, and 13 corresponding thereto. The delay circuits may be one-shot multivibrators, lumped delay lines, distributed delay lines, or any delay system wherein the length of delay may be controlled. The bistable MEMORY circuits each have two input circuits for changing the conductive state of the MEMORY devices, and an output circuit through which an output pulse is delivered when the MEMORY device changes from a first conductive state thereof to a second conductive state thereof. The delay circuits 5, 7, 9, 11, and 13 are serially connected so that a pulse applied to delay circuit 5 is passed down the chain and consecutively appears in the output circuit of the delay circuits after suitable delay intervals determined by the constants of the circuits.

A pulse generator is provided which includes a signal generator 1, the output of which is fed to a wave shaper 3. The signal generator 1 may be a sine wave generator adapted to produce a controllable, frequency-regulated output signal. The wave shaper 3 may be a squaring amplifier, a zero crossing pulser, or other suitable device for producing sharp output pulses. The output signal of wave shaper 3 is applied to an input terminal 4 connected to delay circuit 5 and to the first input circuit of MEMORY circuit 17 by means of electrical lead 17A. The output signals of delay circuits 5, 7, 9, and 11 respectively are connected to the first input circuits of MEMORY circuits 19, 21, 23, and 25, respectively, by electrical leads 19A, 21A, 23A, and 25A. The output pulses from MEMORY circuit 19 appearing on leads 19C are transmitted to the second input circuit of MEMORY circuit 17 by lead 17B. Similarly, the output pulses from MEMORY circuits 21, 23, and 25 are transmitted to the second input circuits of MEMORY circuits 19, 21, and 23, respectively, by electrical leads 23B, 21B, and 19B. Thus, the output pulses from the MEMORY devices are operative to switch the immediately preceding MEMORY devices in the chain, as shown, from the second conductive state thereof to the first conductive state thereof.

The output pulses of the MEMORY circuits 17, 19, 21, 23, and 25 are transmitted to OR circuit 31 on electrical leads 17C, 19C, 21C, 23C, and 25C, respectively, through switches SW1, SW2, SW3, SW4, and SW5, respectively. The output pulses from OR circuit 31 are transmitted to a control circuit of a binary counter 29 by electrical leads 30. The switches SW1, SW2, SW3, SW4, and SW5 function to connect selected MEMORY circuits to OR circuit 31 so that the output pulses from the selected MEMORY circuits will pulse binary counter 29. The binary counter 29 preferably is of the type having an input circuit, an output circuit, and a read circuit wherein the counter is switched back and forth between first and second stable states by successive input pulses to the control circuit, and wherein there is produced an output pulse in the output circuit thereof responsive to a read pulse in the read circuit thereof when the counter switches from the second stable state to the first stable state simultaneously with reception of a read pulse thereby. A suitable device for use with the invention is Model T–102A of Engineered Electronics Company.

The read pulses for the binary counter 29 are derived from the output circuit of delay circuit 13. Manifestly, a pulse is applied to the binary counter 29 after pulses have been applied to all of the MEMORY circuits. The design of the binary counter is such that an output pulse will appear on lead 27B when the binary counter 29 is switched to a first conductive state thereof by a pulse from OR circuit 31 simultaneously with reception of a pulse from delay circuit 13.

The output pulses of binary counter 29 are applied to an input circuit of AND gate 27 by means of lead 27B. The other input signal to AND gate 27 is derived from delay circuit 15 which is pulsed by the output signal from delay circuit 11. The delay time of delay circuit 15 is substantially greater than the delay time of delay circuit 13 and should be such that input signals are applied to AND gate 27 by delay circuit 15 and by binary counter 29 at the same time so that an output pulse will be present in the output signal of AND gate 27. The output signals from AND gate 27 are transmitted to the second input circuit of MEMORY circuit 25 by line 25B.

The operation of the circuit of FIG. 1 will be described in connection with the table of FIG. 2. Let it be assumed that switches SW1, SW3, SW5 are closed and that switches SW2 and SW4 are open. A pulse supplied to input terminal 4 will be simultaneously applied to delay circuit 5 and the first input circuit of MEMORY circuit 17. MEMORY circuit 17 will change to the second stable state thereof and will produce an output signal on leads 17C. After suitable delay, the output signal of delay circuit 5 will be applied to the first input circuit of MEMORY circuit 19 so that an output pulse will appear on leads 19C. This output pulse will pulse MEMORY circuit 17 back to the first stable state thereof. Similarly, the output pulses from delay circuits 7, 9, and 11 will be effective to trigger MEMORY circuits 21, 23, and 25 to produce output pulses on lines 21C, 23C, and 25C. However, only the pulses on lines 17C, 21C, and 25C will be connected to OR circuit 31 so that an odd number of pulses will be counted by binary counter 29. All of the MEMORY circuits 17, 19, 21, and 23 will be returned to their first conductive states responsive to output pulses from MEMORY circuits 19, 21, 23, and 25. Inasmuch as binary counter 29 has counted an odd number of pulses, the read pulse supplied by delay circuit 13 on circuit 28 will produce no output pulse to AND gate 27. Therefore, MEMORY circuit 25 will remain in its second stable state. The conductive states of the counters will be as represented at time step 2 of FIG. 2.

The next pulse supplied to input terminal 4 by signal generator 1 and wave shaper 3 will produce output pulses from MEMORY circuits 17, 19, 21, and 23, but no output pulse from MEMORY circuit 25. Only the output pulses from MEMORY circuits 17 and 21 will be applied to the binary counter 29 through switches SW3, SW5, or circuit 31. A pulse will arrive at AND gate 27 on circuit 27B simultaneously with the delayed pulse on circuit 27A from delay circuit 13. Therefore, an output pulse will be applied to the second input circuit of MEMORY circuit 25. MEMORY circuit 25 will be switched to its first stable state. Note, however, that since there was no output pulse from MEMORY circuit 25 when the circuit was pulsed by the second input pulse from delay circuit 11, MEMORY circuit 23 is now in its second stable state. Thus, the stable state of MEMORY circuit 25 that existed when the second pulse was applied to terminal 4 has been transferred to MEMORY circuit 23. The conductive state of MEMORY circuit 25 will not change inasmuch as no pulse was produced by binary counter 29 to be transmitted through AND gate 27 to change the stable state of MEMORY circuit 25. The conductive states of the MEMORY circuits will be as represented at time step 3 of FIG. 2.

Similarly, the next pulse applied to input terminal 4 will supply only two pulses to binary counter 29. The effect of the third input pulse will be to transfer the stable states of the MEMORY circuits and to leave MEMORY circuit 25 in its second stable state. This state of affairs is represented at time step 4. However, the next input pulse will result in an odd number of pulses being supplied to binary counter 29 so that simultaneous output pulses will be produced from binary counter 29 and AND gate 27 to change the stable state of MEMORY circuit 25, resulting in the various MEMORY circuits assuming the stable states shown at time step 5. The sequence of operations will be repeated until the thirty-second time step. An output signal derived from the output circuit of MEMORY circuit 25 at terminal 33 will have the sequence shown in FIG. 2 running down the column under MEMORY circuit 25. An inspection of this code sequence will show that it is truly a binary code of maximal length inasmuch as any 5-digit code group therein is not repeated for thirty-one time steps.

A similar cycle of operation may be derived assuming that switches SW1 and SW2 are open. The operating sequences of the various MEMORY circuits will be as shown in FIG. 3.

It is manifest that the MEMORY circuits need not all be in the same conductive state at the beginning of a particular cycle of operation. The stable states of the MEMORY circuits may be changed by injecting a pulse into one or the other of the input circuits of any of the MEMORY circuits with the input circuits disconnected from the rest of the system.

The invention is not to be restricted to the use of five MEMORY circuits and associated apparatus as shown in FIG. 1. The number of digits which the invention is capable of handling may be tremendously expanded by using a greater number of MEMORY circuits. For example, by incorporating thirty-two MEMORY circuits, thirty-two associated delay devices, and thirty-two coupling-decoupling switches in the circuit, the generator is capable of generating sequences over 4 billion bits long before repetition of a 32-bit sequence.

Also, the invention is not necessarily to be restricted to the specific circuit connections, structural details, or arrangement of parts herein set forth, as various modifications thereof may be effected without departing from the spirit and scope of the invention.

The objects and features of the invention having been completely described, what I wish to claim is:

1. A pulse code generator, comprising:

electrical terminal means;

a binary shift register counter connected to said terminal means, said counter including a chain of interconnected bistable memory stages adapted to transfer stable states unilaterally along the chain responsive to an input signal coupled to said terminal means, each of said memory stages being adapted to produce an output pulse when changing from one of the stable states thereof to the other of the stabel states thereof;

signal delaying means electrically coupled to said terminal means; and circuit means connected to said binary counter and to said signal delaying means adapted to count output pulses from selected memory stages, responsive to an electrical signal from said signal delaying means to change from said other stable state to said one stable state the memory stage at the end of the chain from which stable states transfer along the chain, when an even number of output pulses from said selected memory stages have been counted by said circuit means.

2. A pulse code generator comprising:

a plurality of shift register stages, each of said stages including bistable memory means;

means including delay means, coupled to said memory means, responsive to a pulse fed thereto to pulse said memory means in succession to shift said memory means from a first stable state to a second stable state;

said memory means being adapted to produce output pulses when shifting from said first stable state to said second stable state;

said memory means being connected in an open-ended chain to transfer stable states unilaterally up the chain in reverse order to the order of pulsing by said means including delay means in response to pulsing by said means including delay means;

first circuit means connected to the last of said bistable memory means and to said delay means so as to be pulsed after all of said memory means have been pulsed, responsive to reception of an odd number of pulses from said delay means to change the stable state of said last of said memory means; and second circuit means for connecting said first circuit means to selected memory means to couple the output pulses of said selected memory means to said first circuit means;

the output of said generator being derived from the output pulses of any one of said memory means.

3. Apparatus for the generation of a binary pulse code, comprising:

a bistable binary counter including an input circuit, an output circuit, and a readout circuit, responsive to a readout pulse fed to said readout circuit to produce an output pulse in said output circuit thereof when in one of the stable states thereof;

a shift register counter including a plurality of bistable memory circuits interconnected in an open-ended chain, responsive to an input pulse applied thereto to sequentially and consecutively transfer stable states between said memory circuits in the order opposite to the order of pulsing by said input pulse, each of said memory circuits being adapted to produce an output pulse upon being shifted from a first stable state thereof to a second stable state thereof;

said shift register counter being connected to said binary counter readout circuit so that said input pulse is fed to said readout circuit after pulsing all of said memory circuits;

first circuit means, including decoupling means, connecting said bistable memory circuits to said binary counter input circuit whereby said output pulses from selected memory circuits will pulse said binary counter;

second circuit means connecting said binary counter output circuit to the last of said memory circuits pulsed by said input pulse to shift said last of said memory circuits from said second stable state to said first stable state responsive to a pulse from said binary counter output circuit; and output terminal means connected to said binary counter to receive output pulses from a preselected one of said memory circuits.

4. Apparatus for the generation of a binary pulse code, comprising:

a plurality of shift register stages, each of said stages including bistable memory means;

means including delay means coupled to said memory means for pulsing said memory means in succession to shift said memory means in succession from a first stable state thereof to a second stable state thereof;

said memory means being connected in an open-ended chain so that output pulses from a given memory means will shift the memory means pulsed by said delay means immediately before pulsing of said given memory means from the second stable state thereof to the first stable state thereof;

circuit means connected to said memory means responsive to reception of an even number of output pulses therefrom to change the stable state of the last of the memory means pulsed by said means including delay means from a second stable state to a first stable state;

an output terminal means connected to one of said bistable memory means to receive output pulses from said one of said bistable memory means when said one of said bistable memory means shifts from the first stable state thereof to the second stable state thereof.

5. Apparatus for the generation of a binary pulse code, comprising:

a serial shift register comprising a plurality of bistable means, each bistable means having a first control circuit for shifting said each bistable means from a first stable state thereof to a second stable state thereof responsive to a pulse coupled thereto, a second control circuit for shifting said each bistable means from said second stable state thereof to said first stable state thereof responsive to a pulse coupled thereto, and an output circuit wherein an output pulse is produced responsive to a pulse coupled to said first control circuit, said bistable means being serially connected in an open-ended chain whereby stable states are unilaterally transferred between adjacent bistable means in said chain responsive to said input pulse;

binary counter means;

second circuit means coupling the output circuit of said bistable means to said binary counter means, said second circuit means including decoupling means for individually decoupling selected output circuits of said bistable means from said binary counter means;

control terminal means for receiving a pulse train of given pulse repetition rate;

delay means coupling said control terminal means to said first control circuits of said bistable means and to said binary counter means adapted to pulse said first control circuits in succession and to thereafter pulse said binary counter means; and circuit means connecting said binary counter means to said first control circuit of the last bistable means pulsed by said delay means for pulsing said first control circuit of said last bistable means responsive to a pulse received by said binary counter means from said delay means and when an even number of pulses has been counted by said binary counter means.

References Cited in the file of this patent

UNITED STATES PATENTS 2,951,230 Cadden ............... Aug. 30, 1960
2,956,180 James ................. Oct. 11, 1960